Jan. 24, 1933.  S. GREEN  1,895,160
COTTON PICKER
Filed Sept. 11, 1929  3 Sheets-Sheet 3
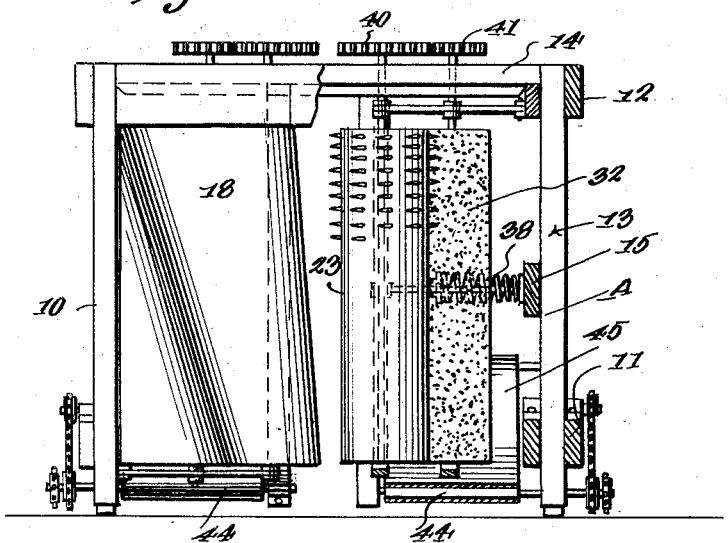
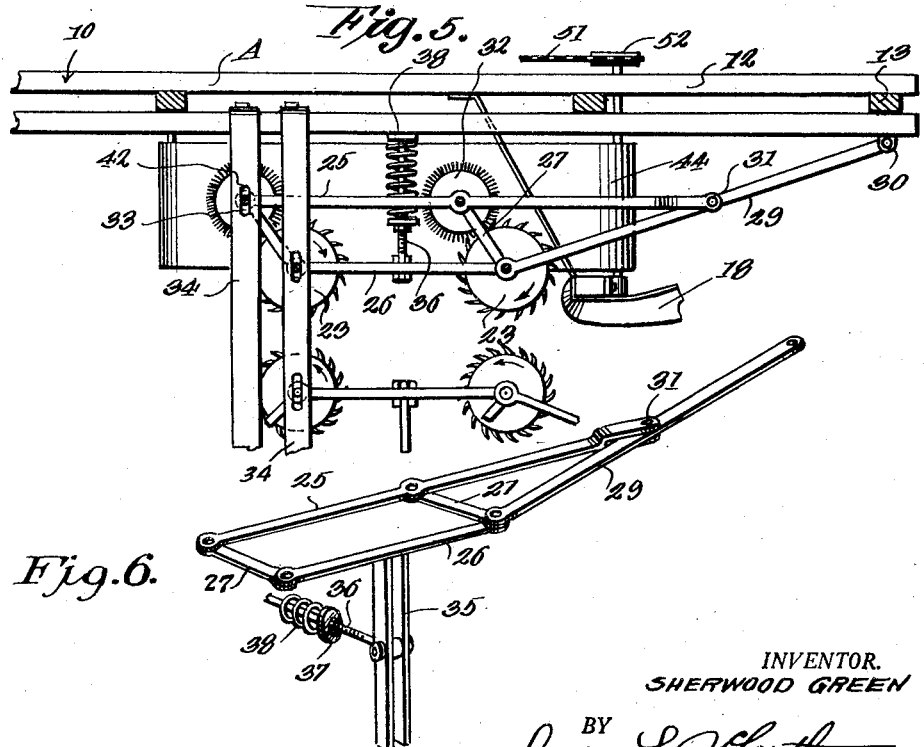
INVENTOR.
SHERWOOD GREEN
BY
*Irving L. Nathan*
ATTORNEYS.

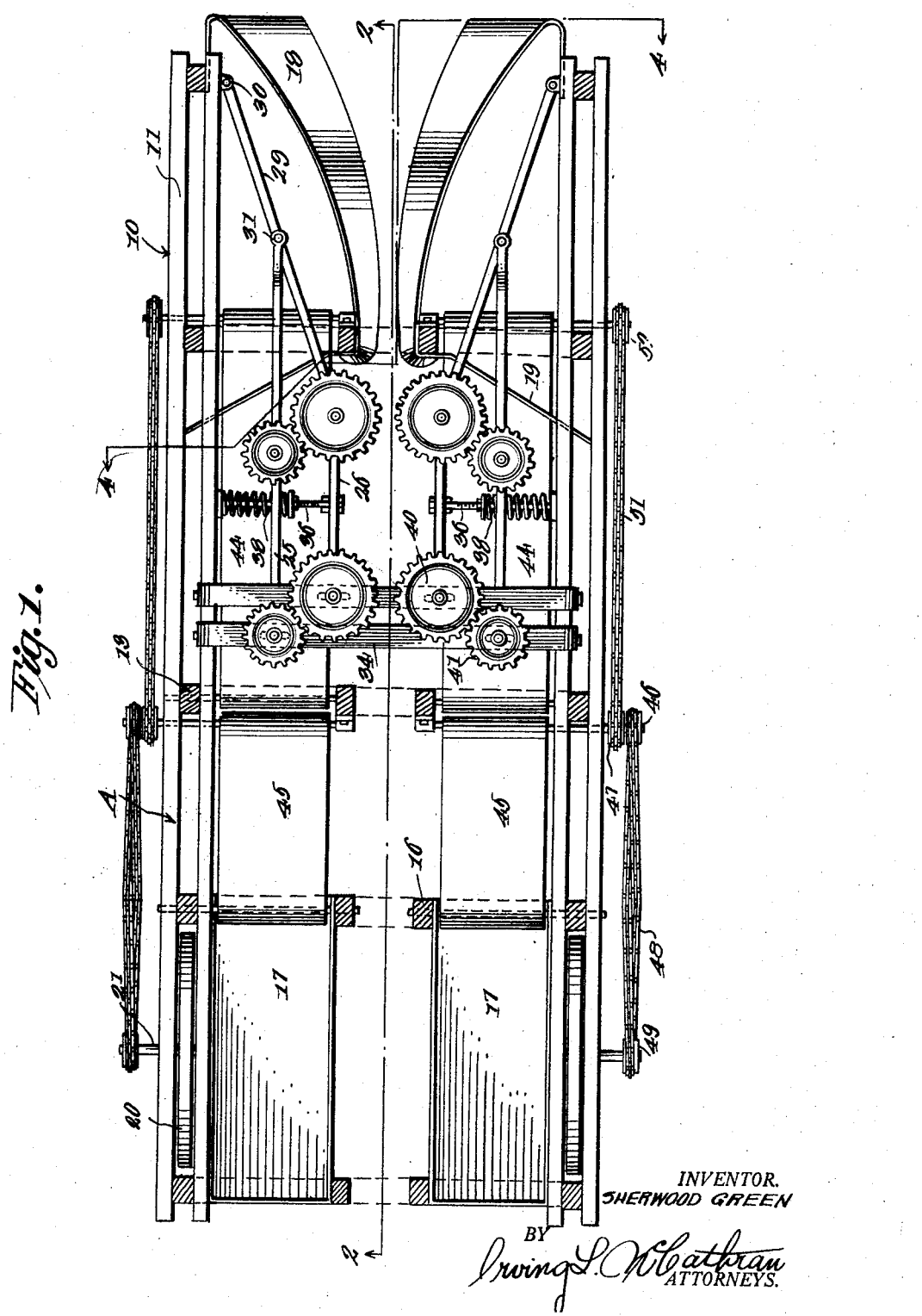

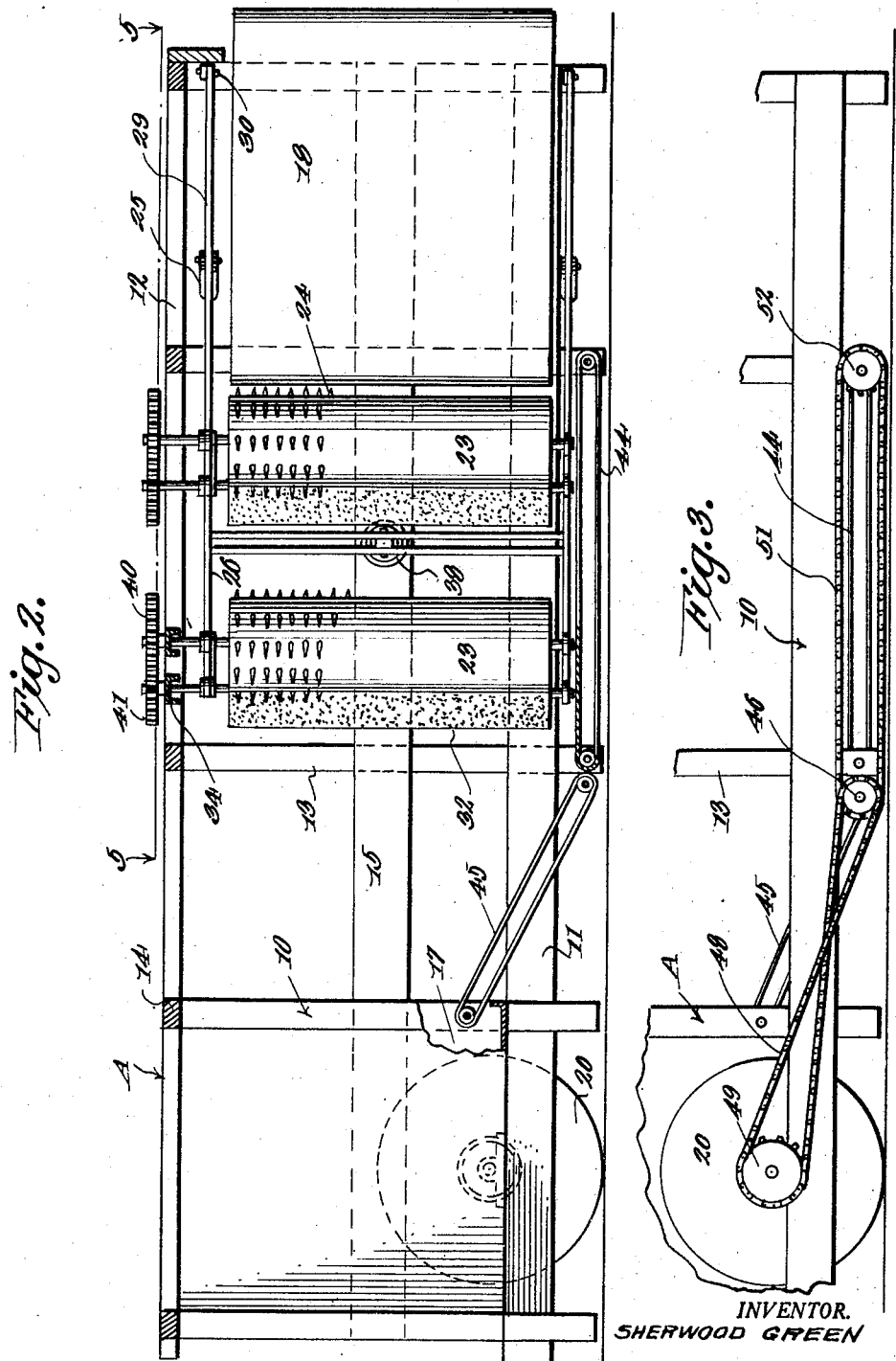

Patented Jan. 24, 1933

1,895,160

UNITED STATES PATENT OFFICE

SHERWOOD GREEN, OF BERKELEY, CALIFORNIA, ASSIGNOR TO AMERICAN COTTON MACHINERY CO., OF BERKELEY, CALIFORNIA, A CORPORATION OF NEVADA

COTTON PICKER

Application filed September 11, 1929. Serial No. 391,932.

This invention appertains to harvesters and more particularly to an improved machine suitable for picking cotton from the growing plant.

One object of my invention is to provide a cotton picking machine embodying rollers or cylinders provided with a plurality of teeth with means for guiding the plants in between the rollers, the rollers being normally urged toward the plants so as to effectively engage the bolls and draw the cotton therefrom, the machine being adapted to be drawn across the field by draft animals, a tractor, or the like.

A further object of my invention is the provision of spaced pairs of rollers or cylinders provided with teeth for engaging a cotton plant and bolls with novel frames for supporting the pairs of rollers on each side of the longitudinal axis of the machine with spring means for urging the pairs of rollers in parallel relation to one another toward the longitudinal axis of the machine whereby the bolls will be effectively engaged, the rollers or cylinders also serving as an effective means breaking open the unopened bolls whereby the cotton can be removed therefrom.

A further object is to devise suitable means in a machine of this character for effectively removing cotton from the teeth on the cylinder.

A further object of my invention is the provision of means for receiving the cotton and for delivering the same to suitable receptacles, as the machine is moved down the row of cotton plants.

A still further object of my invention is to provide an improved cotton picking machine of the above character, which will be durable and efficient in use, one that will be simple and easy to manufacture, and one which can be placed upon the market at a reasonable cost.

With these and other objects in view, one embodiment of the invention consists in the novel construction, arrangement and formation of parts, as will be hereinafter more specifically described, claimed, and illustrated in the accompanying drawings, in which drawings:—

Figure 1 is a top plan view of one embodiment of my improved cotton picking machine with parts thereof broken away and in section.

Figure 2 is a central longitudinal section through the machine taken on the line 2—2 of Figure 1, looking in the direction of the arrows.

Figure 3 is a fragmentary side elevation of the machine illustrating the means for driving the conveyor belt.

Figure 4 is a transverse section taken on the line 4—4 of Figure 1 looking in the direction of the arrows.

Figure 5 is a horizontal section taken on the line 5—5 of Figure 2 looking in the direction of the arrows, and Figure 6 is a fragmentary detail perspective view illustrating the upper portion of one frame for carrying one pair of rollers.

Referring to the drawings in detail, wherein similar reference characters designate corresponding parts throughout the several views, the letter A generally indicates my improved cotton picking machine which comprises a suitable frame 10 for supporting the various parts of the machine.

The frame 10 in the particular embodiment illustrated includes lower pairs of longitudinally extending beams 11 and similar upper pairs of beams 12, the pairs of upper and lower beams having secured thereto uprights or standards 13. Transversely extending frame bars 14 can be employed for connecting the upper pairs of beams 12 together and, for convenience, these transverse frame bars can be connected to the upper pairs of beams 12 at the point of connection of the uprights 13 therewith. If desired the uprights 13 on each side of the frame can be connected together intermediate their ends by longitudinally extending boards or the like 15. A pair of rows of spaced intermediate uprights 16 can be secured to the transverse frame bars 14 in any desired way. In any convenient position relative to the frame and preferably adjacent to the rear end thereof, I arrange receptacles 17 which can be secured, for example, to the rear intermediate uprights 16 and the inner lower longitudinal beams 11. These receptacles are adapted to receive the cotton picked by my improved mechanism.

At the extreme front of the machine, I provide outwardly flared guide fenders or shields 18 which can be made of sheet metal or the like and these fenders are preferably arranged on opposite sides of the longitudinal center of the machine and gradually converge toward one another at their rear ends for guiding the cotton plants into the machine. The forward end of the guide shields can be secured to the front of the frame, while the rear ends of the shields can be secured to the front pair of intermediate uprights or standards 16. These uprights or standards 16 can be braced by suitable brace bars or struts 19.

The entire frame is mounted in such a manner as to permit the frame to be easily moved down the rows of cotton plants and in the present instance I have shown rear wheels 20 for supporting the frame. Wheels 20 can be secured to suitable axles 21 mounted in bearings carried, for example by the lower pairs of longitudinal beams 11. The forward end of the frames can likewise be supported by suitable wheels, caster rollers or the like, but in the present instance it is contemplated to support the front of the frame directly by the tractor utilized for drawing the machine down the field.

Between the guide shields 18 and receptacles 17 I arrange means for engaging the cotton plant and for stripping the cotton from the cotton bolls. This cotton picking means comprises a plurality of picker drums 23 and in the embodiment illustrated, I have shown a pair of drums 23 on each side of the longitudinal axis of the frame. The surface of each of the drums is provided with a plurality of teeth 24 which are similar to the teeth on saws or cotton gins.

Teeth 24 are adapted to engage the cotton and remove it from the plants as the plants pass between picker drums 23. For making teeth 24 more effective, I prefer to mount them in such a manner that they point in the direction that the surface of the picker drum is traveling. Thus, in operation, teeth 24 become embedded in the cotton and in this manner pull the cotton from the plants. It is to be understood that while the picker mechanism is especially adapted for harvesting cotton from growing plants it is also suitable for removing cotton from plants which have been severed from the ground.

In order that the picker drums will be equally effective on plants of different sizes, I have devised means for causing relative movement between the drums in each pair. Preferably, the drums in each pair are urged toward each other by any suitable yieldable means connected to one or both of the drums. Normally, the space between the teeth on the respective drums which form a pair is such that even the smallest plant will be effectively stripped of its cotton. As larger plants are encountered, the drums are forced further apart and the largest plants provided for in the design of the machine will force the drums to or near their extreme limit in the other direction. Thus, plants of all sizes will be literally squeezed between the drums, each plant or group of plants determining by its own size the amount of separation between the drums. The pressure exerted by the drums on the plants is preferably great enough to break open any unopened bolls on the plants, thereby making the lint therein accessible to teeth 24.

Any suitable means can be employed for yieldably urging one drum against the other or for urging both drums together and I do not wish to be limited to any particular form or forms except as defined in the appended claims. Hydraulic means, pneumatic means, and spring means are among those which can be utilized for producing the desired pressure between the rolls.

As representative of suitable means for urging drums 23 toward one another, I have shown supporting frames for the drums resiliently mounted by means of springs. Each supporting frame includes upper and lower outer longitudinal bars 25 and upper and lower inner bars 26. Bars 25 and 26 are connected together adjacent to their opposite ends by pivoted links 27. The forward ends of the bars 26 are connected by means of suitable pivots to forwardly extending supporting bars or rods 29 which are in turn pivotally connected as at 30 to the forward end of the frame. The outer bars 25 are connected to the supporting bars 29 by suitable pivots 31. The inner bars 26 of each of the frames has journaled therein preferably at the point of connection of the links 27 therewith the picker drums 23 while the outer bars 25 have journaled therein preferably at the point of connection of the link 27 therewith vertically disposed brush drums or rollers 32. The rear brush rollers and the rear picker drums 23 have the terminals of their shafts slidably and rotatably mounted in suitable bearing slots 33 formed in the transversely extending upper and lower beams 34 which are bolted or otherwise secured to the main frame. The upper and lower inner bars 26 of each of the supporting frames are connected together by vertical uprights 35 and these uprights have connected thereto by means of suitable pivots laterally extending guide rods 36, the outer ends of which are slidably mounted in the frame boards 15. These guide rods 36 have secured thereto suitable washers or collars 37, which are preferably adjustable along rods 36, against which bear relatively heavy coil springs 38 carried by rods 36. The outer end of each spring bears against the frame boards 15 and thus the springs function to normally urge the supporting frames inwardly and the picking drums of each pair of drums toward one another. By making collars 37 adjustable, the tension of springs 38 can be adjusted in a convenient manner. Other arrangements for adjusting springs 38 will be apparent to those skilled in the art.

Brushes 32 are adapted to remove the cotton from teeth 24 by sweeping the cotton from the teeth in the direction in which the teeth point. Any other suitable means, however, can be provided for this purpose, as for example, means employing compressed air or vacuum suction. When rotary brushes are employed, however, they are most effective when the peripheral speed of the brushes exceeds the peripheral speed of the picking drums. The peripheral speed of the brushes 32 can be increased by increasing the diameter of the brushes or by increasing the angular velocity. In the particular embodiment shown, brushes 32 are geared to drums 23 to rotate therewith, but in the opposite direction and at a higher velocity. To accomplish this object the upper terminals of the shafts or spindles of the picker drums 23 can be provided with relatively large gears 40, while the upper ends of the shaft or spindles of the brushes 32 can be provided with relatively small gears 41 which mesh with the large gears. The picker drums can be rotated by the wheels 20 of the machine by any suitable motion transmission mechanism between the wheels and the drums, and through the medium of spring 38 the picker drums will engage the plants with considerable pressure. However, an external driving means, such as a motor, on the frame of the machine can be provided for positively driving the picker drums and brushes. It is desirable that the brushes on each side of the machine be maintained in parallel relation so as to permit the opposite drums to be in direct transverse alignment for effectively engaging the plants. To enable movement of the frames about pivots 30, the ends of the shafts of the rear picker drums and brushes are slidably and rotatably received in the guide slots 33 formed in the transversely extending guide beams 34 which can be of channel beam construction.

In order to provide means for conveying the cotton from the brushes to the receptacles 17, I provide directly below the brushes 32 and on each side of the longitudinal axis of the machine endless conveyors 44 which are rotatably mounted in suitable bearings carried by certain of the uprights 13. In rear of the horizontal conveyors 44 I provide upwardly and rearwardly inclined conveyors 45 which receive the cotton from the conveyors 44 and deliver the same into the receptacles 17, it being noted that the rear ends of the inclined conveyors extend into said receptacles. These conveyor belts can be driven in any desired way and in the embodiment illustrated the forward shaft of the conveyor 45 is provided with a pair of spaced sprocket wheels 46 and 47 and that a sprocket chain 48 is trained about the sprocket wheel 46 and about a sprocket wheel 49 keyed to the axle of one ground wheel 20. The other sprocket wheel 47 has trained thereabout a sprocket chain 51 which is in turn trained over a sprocket wheel 52 keyed to the forward shaft of the horizontal conveyor. It is to be noted that the drives for the conveyors on each side of the machine are identical.

Other means can be provided for conveying the cotton from the brushes and the conveyors have only been illustrated by way of example of showing one means of accomplishing this.

It is obvious from the foregoing that I have provided novel frames for supporting pairs of front and rear picker drums disposed on each side of the longitudinal axis of the machine and that these frames are so mounted as to maintain the front and rear pairs of drums in parallelism at all times with means for normally urging the drums into frictional engagement with the cotton plants.

In operation of my improved machine, the same is drawn down a row of cotton plants and the shield 18 will guide the plants between the picker rollers or drums 23. The teeth 24 on these drums will engage and pull the cotton from the cotton bolls and these drums will serve as means for cracking open any unopened bolls. The brushes in turn rotating at a higher rate of speed than the drums will brush the cotton therefrom and deliver the same to the lower horizontal conveyors 44 which will in turn deliver the cotton to the inclined conveyors 45. These conveyors in turn will deliver the same to the collection receptacles 17 where the cotton can be conveniently removed.

Changes in details may be made without departing from the spirit or the scope of this invention, but:—

What I claim as new is:

1. In a cotton picking machine, a frame, a front and rear vertically disposed toothed cotton picking drum on each side of the longitudinal center of the frame, thereby forming front and rear pairs of drums, means normally urging the drums of each pair toward one another, brushes extending longitudinally of the picking drums, means for driving the brushes from the picking drums, and means for maintaining the axis of rotation of each drum a fixed distance from the axis of its associated brush.

2. A cotton picking machine comprising a main frame, a front and rear toothed cotton picking drum arranged on each side of the longitudinal center of said frame, the front drum and the rear drum on each side of the longitudinal center being arranged in parallel relationship, frames on each side of the longitudinal center of the main frame for supporting said drums, means engaging the supporting frame for yieldably urging the drums on opposite sides of the machine toward one another and means for guiding cotton plants between the drums on opposite sides of the main frame.

3. A cotton picking machine comprising a main frame, front and rear vertically disposed toothed rollers arranged on each side of the longitudinal center of the main frame, rotatable brushes extending the full length of each picking roller and engaging the surface thereof, a supporting frame for supporting the brushes and rollers on each side of the main frame, transversely extending guide bars carried by the main frame having guide slots therein for receiving the pintles of the rear picker rollers and brushes for maintaining the picker rollers on the opposite sides of the main frame in parallel relationship, and spring means engaging the supporting frames for yieldably urging the picker rollers on opposite sides of the frame toward one another.

4. In cotton picking apparatus, a pair of rotatable drums between which cotton plants are adapted to be passed, and yieldable means allowing relative movement between said drums, the extent of movement being determined by the plants passing between the drums, said yieldable means adapted to exert sufficient pressure between said drums to break open unopened bolls on the plants.

In testimony whereof I affix my signature.

SHERWOOD GREEN.